(12) United States Patent
Nakayama et al.

(10) Patent No.: US 7,073,937 B2
(45) Date of Patent: Jul. 11, 2006

(54) HEAT EMITTING PROBE AND HEAT EMITTING PROBE APPARATUS

(75) Inventors: Yoshikazu Nakayama, Hirakata (JP); Akio Harada, Osaka (JP)

(73) Assignees: Yoshikaza Nakayama, Osaka (JP); Daiken Chemical Co., Ltd., Osaka (JP)

( * ) Notice: Subject to any disclaimer, the term of this patent is extended or adjusted under 35 U.S.C. 154(b) by 0 days.

(21) Appl. No.: 10/074,624

(22) Filed: Feb. 13, 2002

(65) Prior Publication Data

US 2002/0110177 A1    Aug. 15, 2002

(30) Foreign Application Priority Data

Feb. 13, 2001    (JP) ............................ 2001-081671

(51) Int. Cl.
*G01K 7/00*    (2006.01)
*G01K 3/00*    (2006.01)

(52) U.S. Cl. ...................... 374/164; 977/867; 977/863; 977/876; 374/137

(58) Field of Classification Search ................ 374/164, 374/142, 183, 166, 137, 44; 977/DIG. 1, 977/849, 860, 861, 863, 867, 876, 943, 947, 977/955, 875
See application file for complete search history.

(56) References Cited

U.S. PATENT DOCUMENTS

| | | | | |
|---|---|---|---|---|
| 4,747,698 A | * | 5/1988 | Wickramasinghe et al. .... | 374/6 |
| 4,918,309 A | * | 4/1990 | Beha et al. .................. | 250/306 |
| 4,954,704 A | * | 9/1990 | Elings et al. ................ | 250/307 |
| 5,047,637 A | * | 9/1991 | Toda ........................... | 250/306 |
| 5,388,323 A | * | 2/1995 | Hopson et al. ............... | 29/595 |
| 5,441,343 A | * | 8/1995 | Pylkki et al. ................ | 374/137 |
| 5,824,470 A | * | 10/1998 | Baldeschwieler et al. ...... | 435/6 |
| 5,929,438 A | * | 7/1999 | Suzuki et al. ............... | 250/306 |
| 5,969,238 A | * | 10/1999 | Fischer ........................ | 73/105 |
| 6,071,009 A | * | 6/2000 | Clyne .......................... | 374/137 |
| 6,146,227 A | * | 11/2000 | Mancevski .................... | 445/24 |

(Continued)

FOREIGN PATENT DOCUMENTS

JP    2000321292 A    * 11/2000

*Primary Examiner*—Diego Gutierrez
*Assistant Examiner*—Mirellys Jagan
(74) *Attorney, Agent, or Firm*—Koda & Androlia

(57) ABSTRACT

A heat emitting probe including a conductive nanotube probe needle with its base end fastened to a holder and its tip end protruded, a heat emitting body formed on the probe needle, a conductive nanotube lead wire fastened to the heat emitting body, and an electric current supply that causes an electric current to pass through the conductive nanotube lead wire and both ends of the probe needle. The tip end of the probe needle is thus heated by an electric current flowing through the heat emitting body. A heat emitting probe apparatus includes the above-described heat emitting probe, a scanning mechanism that allows the heat emitting probe to scan over a thermal recording medium, and a control circuit that causes the tip end of the probe needle to emit heat, thus recording extremely small hole patterns in the surface of a thermal recording medium.

5 Claims, 7 Drawing Sheets

U.S. PATENT DOCUMENTS

| | | | |
|---|---|---|---|
| 6,159,742 A * | 12/2000 | Lieber et al. | 436/164 |
| 6,233,206 B1 * | 5/2001 | Hamann et al. | 369/13.01 |
| 6,528,785 B1 * | 3/2003 | Nakayama et al. | 250/306 |
| 6,636,050 B1 * | 10/2003 | Nakayama et al. | 324/537 |
| 6,703,615 B1 * | 3/2004 | Nakayama et al. | 250/306 |
| 6,735,046 B1 * | 5/2004 | Nakayama et al. | 360/110 |
| 6,777,693 B1 * | 8/2004 | Nakayama et al. | 250/492.2 |
| 6,787,769 B1 * | 9/2004 | Nakayama et al. | 250/306 |
| 2002/0084410 A1 * | 7/2002 | Colbert et al. | 250/306 |
| 2002/0112814 A1 * | 8/2002 | Hafner et al. | 156/272.2 |
| 2002/0121897 A1 * | 9/2002 | Mukasa et al. | 324/244 |
| 2002/0122766 A1 * | 9/2002 | Lieber et al. | 423/447.3 |
| 2003/0189351 A1 * | 10/2003 | Nakayama et al. | 294/99.1 |
| 2004/0074288 A1 * | 4/2004 | Shirakawabe et al. | 73/105 |
| 2005/0017171 A1 * | 1/2005 | Samuelson et al. | 250/306 |

\* cited by examiner

HEAT EMITTING PROBE AND HEAT EMITTING PROBE APPARATUS

BACKGROUND OF THE INVENTION

1. Field of the Invention

The present invention relates to a heat emitting probe that performs thermal operations in a pinpoint fashion on the surface of a sample and to an apparatus that uses such a heat emitting probe.

2. Prior Art

Conventionally, magnetic recording media such as magnetic disks, etc., and optical recording media such as optical disks, etc. are widely used as recording media for information. In recent years, thermal recording media have begun to be developed.

Such thermal recording media are obtained from a low-melting-point organic substance, and information is recorded on such media by forming fusion type holes in the surface thereof by means of heat. For example, a hole is defined as "1", and the absence of a hole is defined as "0"; and information is recorded by series of these holes. Since the density at which information is recorded increases with a decrease in the diameter of these holes (hereafter referred to as the "hole diameter"), the size of a heat emitting probe used for heating is important.

FIG. 9 is a schematic perspective view showing the manner of recording of information by way of a conventional heat emitting probe.

This heat emitting probe 19 is constructed by machining an AFM cantilever 2 that is used in an atomic force microscope (AFM). The cantilever 2 comprises a cantilever portion 4 and a holder 8 that is disposed so as to protrude from the tip end of the cantilever portion 4. In an AFM cantilever, the holder 8 is usually called a protruding portion or pyramid portion.

Electrode films 5 and 6 are provided on both side surfaces of the cantilever portion 4. These films are formed by coating the side surfaces of the cantilever portion 4 with a conductive substance. A control circuit C is connected to the rear ends of the electrode films 5 and 6 via contact points 5a and 6a. The control circuit C is comprised of a power supply 20 which supply a desired voltage (or current) and a switch 21.

Furthermore, conductive electrode films 5c and 6c are formed on the side surfaces of the holder 8, and these conductive electrode films 5c and 6c are respectively electrically connected to the electrode films 5 and 6. The material of these conductive electrode films 5c and 6c is the same as that of the electrode films 5 and 6. The holder 8 has a sharpened holder tip end 8a, and the holder tip end 8a is positioned near the surface of a thermal recording medium 22.

The operation of this heat emitting probe 19 will be described below.

When the switch 21 is turned on, the voltage of the power supply 20 is applied to the holder 8 via the conductive electrode films 5c and 6c. Since the holder 8 of the AFM cantilever 2 is formed from a silicon semiconductor and has a fairly large electrical resistance, the holder 8 functions as a heat emitting body. As the holder 8 emits heat, the holder tip end 8a becomes a heating point.

Since the holder tip end 8a is located near the surface of the thermal recording medium 22, the portion of the thermal recording medium 22 that directly faces the holder tip end 8a is melted by heating. As a result, a hole 23 is formed. As the heat emitting probe 19 is appropriately run to scan by a separately installed driving device, holes 23 are intermittently formed by melting. Then, information is recorded on the thermal recording medium by the on-off formation of these numerous holes 23.

In such fusion type holes 23, as the hole diameter D is reduced, the recording density of the thermal recording medium increases. In other words, since the recording density must be considered in terms of a two-dimensional plane, the recording density is inversely proportional to $D^2$. Meanwhile, the hole diameter D depends on the curvature radius of the holder tip end 8a.

Since the holder 8 is manufactured using semiconductor techniques, it is extremely difficult to reduce the curvature radius of the holder tip end 8a to a value that is less than 10 nm. Since the hole diameter D is larger than this curvature radius, it is an extremely difficult task to control the hole diameter to a value of several tens of nm (nanometer) or less. Accordingly, the recording density of conventional thermal recording media that can be achieved by means of a heat emitting holder utilizing an AFM cantilever has limitations.

Thus, in the past, problems exist not only in regard to the input and output of thermal recording media, but also in regard to thermal measurements of general sample surfaces on the nano-scale. Conventionally, there has been no means for measuring the temperature distribution of the sample surface on the nano-scale. Nor has there been any means in the past for measuring the thermal conductivity distribution of sample surfaces on the nano-scale. However, such thermal measurement sensors are indispensable for the effective development of nano-science.

SUMMARY OF THE INVENTION

Accordingly, it is an object of the present invention to provide a heat emitting probe and a heat emitting probe apparatus that increase the recording density of thermal recording media by using the tip end of a conductive nanotube such as a carbon nanotube, etc. as a heat emitting point instead of the tip end of a cantilever, so that the diameter of the fusion type holes can be reduced to a few nanometers.

It is another object of the present invention to provide a heat emitting probe and a heat emitting probe apparatus that detect thermal information such as temperature distribution, thermal conductivity distribution, etc. of sample surfaces using the tip end portion of such a conductive nanotube.

In other words, the present invention is for a heat emitting probe and a heat emitting probe apparatus in which a heat emitting probe is obtained by fastening a conductive nanotube probe needle such as a carbon nanotube to a holder, so that ultra-fine fusion type hole patterns can be recorded at a high density in a thermal recording medium by heating the tip end of the conductive nanotube probe needle, and so that temperature distribution, thermal conductivity distribution, etc. of a sample surface can be detected.

More specifically, the above objects are accomplished by a unique structure of the present invention for a heat emitting probe that is comprised of:

- a conductive nanotube probe needle with its base end portion fastened to a holder and its tip end portion protruded,
- a heat emitting body formed on a circumferential surface of the conductive nanotube probe needle, and
- a conductive nanotube lead wire fastened to the heat emitting body.

Moreover, the above heat emitting probe can be further provided with a means for causing an electric current to pass through both ends of the conductive nanotube lead wire and the conductive nanotube probe needle, so that an electric current is caused to pass through the heat emitting body provided on the probe needle.

In the heat emitting probe of the present invention, an AFM cantilever in which a protruding portion used as the holder is formed on a cantilever portion thereof is employed, two electrode films are formed on the cantilever portion, one end of the conductive nanotube lead wire is connected to one of the electrode films, and the conductive nanotube probe needle is connected to another of the electrode films, so that an electric current is caused to pass between the electrode films.

Also in the present invention, an AFM cantilever in -which a protruding portion used as the holder is formed on a cantilever portion thereof is employed, two electrode films are formed on the cantilever portion, one end of the conductive nanotube lead wire is connected to one of the electrode films, and the conductive nanotube probe needle and another of the electrode films are connected by means of another conductive nanotube lead wire, so that an electric current is caused to pass between the electrode films.

Furthermore, the above objects are accomplished by a unique structure of the present invention for a heat emitting probe apparatus that comprises:

the above-described heat emitting probe, a scanning mechanism that allows the tip end of the conductive nanotube probe needle of the heat emitting probe to scan over a sample, and a control circuit which passes an electric current through the tip end of the conductive nanotube probe needle, wherein the tip end of the conductive nanotube probe needle scans the surface of a sample.

In this heat emitting probe apparatus, the sample is a thermal recording medium, and the tip end of the conductive nanotube probe needle is heated by the heat emitting probe; and information is recorded by means of a hole pattern formed in the surface of the thermal recording medium.

Also, in the above heat emitting probe apparatus, the tip end of the conductive probe needle scans over the sample surface while being heated by the heat emitting probe, thus detecting thermal conductivity distribution of the sample surface by means of variations in an amount of radiant heat from the heat emitting body or of variations in resistance of the heat emitting body.

Further in the above heat emitting probe apparatus, the sample surface is scanned by the tip end of the conductive nanotube probe needle using the heat emitting probe, thus detecting temperature distributions of the sample surface as variations in resistance of the heat emitting body.

DETAILED DESCRIPTION OF THE INVENTION

Embodiments of the heat emitting probe and the heat emitting probe apparatus of the present invention will be described in detail below with reference to the accompanying drawings.

Figure 1:
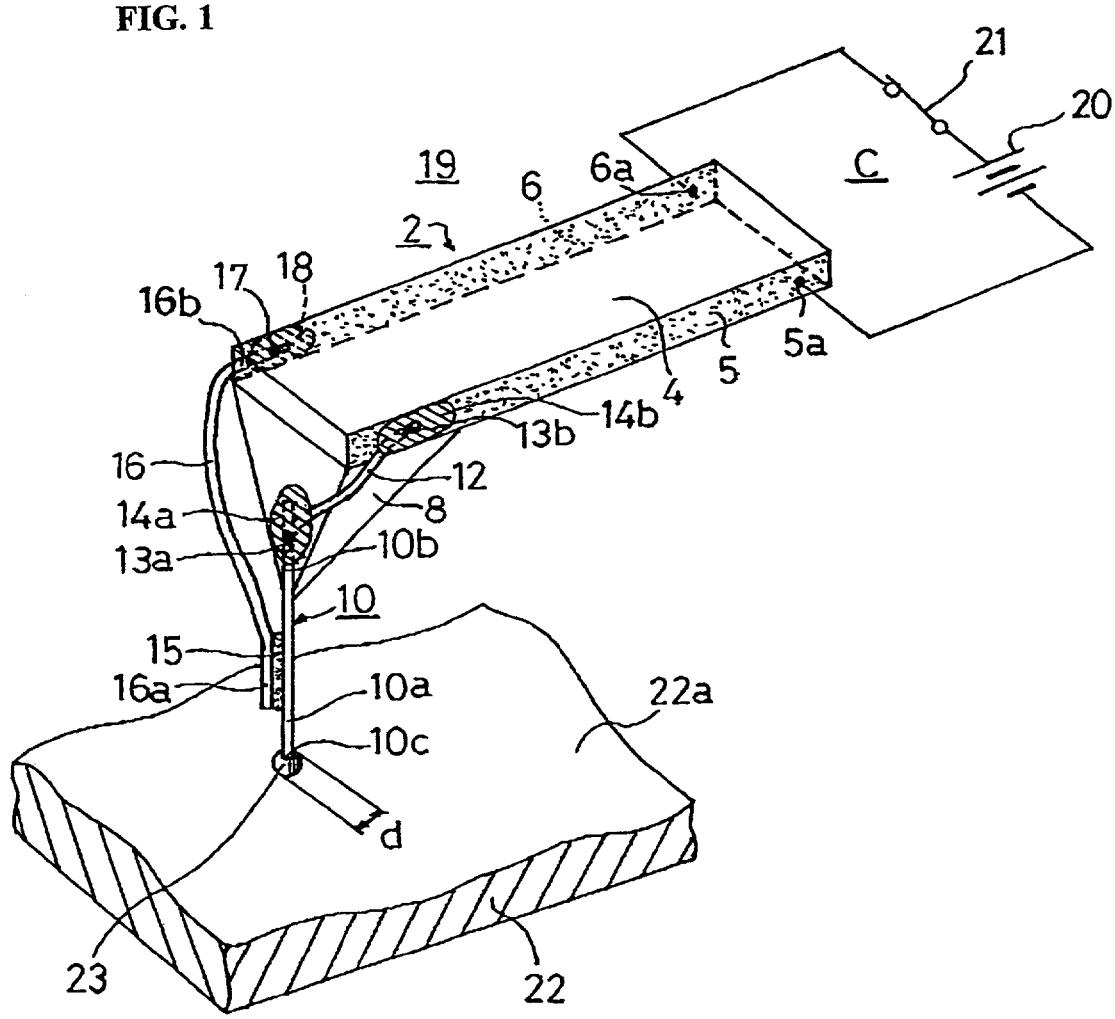
FIG. 1 is a schematic perspective view of a first embodiment of the heat emitting probe according to the present invention.

FIG. 1 shows the first embodiment of the heat emitting probe of the present invention.

As in the conventional heat emitting probe, the heat emitting probe 19 is obtained by machining an AFM cantilever 2. The cantilever 2 is comprised of a cantilever portion 4 and a holder 8 (which is also referred to as a protruding portion or pyramid portion), and the holder 8 protrudes from the tip end of the cantilever portion 4.

Electrode films 5 and 6 are provided on both side surfaces of the cantilever portion 4. These films are formed by coating the side surfaces of the cantilever portion 4 with a conductive substance. A control circuit C is connected to the rear end portions of the electrode films 5 and 6 via contact points 5a and 6a. The control circuit C is comprised of a power supply 20 and a switch 21.

A conductive nanotube probe needle 10 is disposed on the holder 8. The conductive nanotube probe needle 10 is obtained by fastening the base end portion 10b of a conductive nanotube to the holder 8 with the tip end portion 10a of the conductive nanotube protruded downward and the tip end 10c is disposed near the surface of a thermal recording medium 22.

The base end portion 10b of the conductive nanotube probe needle 10 is fastened to the holder 8 by thermal fusion accomplished by irradiation with an electron beam. Alternatively, the base end portion 10b may be fused by passing an electric current through the base end portion 10b or may be fastened by means of a coating film.

A conductive nanotube lead wire 12 is interposed between the base end portion 10b and the electrode film 5, and both ends of this lead wire 12 are likewise fastened by thermal fusion. It is indeed also possible to fasten this lead wire 12 in place by means of coating films instead of thermal fusion.

Coating films 14a and 14b are formed respectively on the base end portion 10b and fused portion 13b, so that the conductive nanotube probe needle 10 and conductive nanotube lead wire 12 are strongly fastened to the holder 8 and electrode film 5.

A heat emitting body 15 is formed by deposition (effected by causing an electric current to pass through) in a specified location on the circumferential surface of the conductive nanotube probe needle 10.

A conductive nanotube lead wire 16 is interposed between the heat emitting body 15 and the electrode film 6. The end portions 16a and 16b of the lead wire 16 are respectively connected to the heat emitting body 15 and electrode film 6 by thermal fusion. It is also indeed possible to fasten the end portions of the lead wire 16 by creating a state of physical adsorption using coating films. The formation of such coating films can be simply accomplished using a method such PVD (physical vapor deposition) process or CVD (chemical vapor deposition) process.

The fused portion 17 of the lead wire end portion 16b is further strongly fastened to the electrode film 6 by a coating film 18. A strong fastening to the lead wire end portion 16a is realized by forming a coating film that covers the entire circumference of the conductive nanotube probe needle 10 as an integral part of the probe needle 10. This circumferential coating film is, however, not shown in the drawing.

Nanotubes can be divided generally into conductive nanotubes and insulating nanotubes. Conductive nanotubes include nanotubes that conduct electricity such as carbon nanotubes, and insulating nanotubes include non-conductive nanotubes such as BCN (boron carbonitride) type nanotubes and BN (boron nitride) nanotubes, etc. If a conductive coating film is formed on the surface of an insulating nanotube by a known method such as PVD, CVD, etc., then this nanotube can be endowed with conductivity; accordingly, such nanotubes also belong to the category of conductive nanotubes.

In the present invention, a voltage is applied to the nanotube probe needle and nanotube lead wires, so that an electric current is caused to pass through the needle and lead wires. Accordingly, the nanotubes must possess electrical conductivity. Thus, the nanotube probe needle and nanotube lead wires are referred to as a conductive nanotube probe needle and conductive nanotube lead wires.

The coating films may be formed by irradiating specified locations with an electron beam, thus breaking down the organic substances that are present as impurities inside the electron microscope apparatus so that carbon is deposited in such specified locations. Of course, if an organic substance deposited in the specified locations is irradiated, substances other than carbon will be scattered; and carbon will remain so as to form the coating films. Naturally, it is also possible to introduce an organic gas into the electron microscope apparatus and break down this gas. A similar treatment may also be performed using an ion beam instead of an electron beam.

A metal material such as Ag, Ni, Au, Pd, Mo, Mn, W, etc. or a currently known material having resistance, e.g., an intermetallic compound such as $Re_2O_3$, $Mn_2O_3$, $LaMnO_3$, etc. may be used as the material of the heat emitting body. Furthermore, the heat emitting body can be constructed by introducing such heat emitting body raw materials in the form of an organo-metallic gas, and breaking this gas down by means of an electron beam or ion beam so that the material is deposited in the form of a thin film.

Carbon nanotubes are a typical example of conductive nanotubes. The cross-sectional diameters of carbon nanotubes range from approximately one (1) nanometer to several tens of nanometers, and the axial lengths of such nanotubes range from the nanometer order to the micron order. The property of such nanotubes that directly relates to the present invention is the cross-sectional diameter; the smallest theoretical value that can be realized from the structure of such nanotubes is approximately 1 nm. The cross-sectional diameter of the conductive nanotube probe needle 10 shown in FIG. 1 is approximately 1 nm. The present invention is the first heat emitting probe to have such a small cross-sectional diameter.

The operation of the heat emitting probe having the above-described structure will be described below.

The switch 21 is turned on so that a voltage is applied to the heat emitting body 15 by the power supply 20. The heat emitting body 15 shows resistance heat emission as a result of the passage of an electric current through the heat emitting body 15, so that the tip end 10c of the conductive nanotube probe needle 10 becomes a heat emitting point. The power supply 20 can be constructed not only as a voltage circuit but also as a current circuit.

Since the tip end 10c is disposed in close proximity to the surface of the thermal recording medium 22, specified portions of the thermal recording medium 22 are melted by the heat emission from the tip end 10c, so that holes 23 are formed. The hole diameter d of these holes 23 depends on the diameter of the tip end 10c. Since the diameter of this tip end 10c is approximately 1 nm as described above, the hole diameter d is a few nanometers.

When these holes 23 are formed, information is recorded on the thermal recording medium 22. Since the hole diameter d formed by a nanotube is 1/10 the conventional hole diameter D or less, the hole area obtained by the present invention is 1/100 the conventional hole area or less. In other words, it should be noted that in the present invention the information recording density which gives the number of holes per unit area can be set at 100 times the conventional recording density or greater.

If a process is defined so that a value "1" is given when a hole 23 is formed and a value "0" is given when there is no hole, then holes 23 can be intermittently formed in the thermal recording medium 22 by controlling the current application of the control circuit C. A similar effect can also be obtained in cases where the process is conversely defined so that a value "0" is obtained when there is a hole 23 and a value "1" is obtained when there is no hole 23.

This heat emitting probe 19 is a heat emitting probe and is at the same time a scanning electron microscope probe. In other words, if the control circuit C is stopped, the tip end 10c functions as an AFM probe needle. If an AFM operation is performed on the surface of the thermal recording medium 22 by means of the tip end 10c, then indentations and projections on the surface can be detected, so that the recorded information can be outputted. In other words, the heat emitting probe 19 can record information by forming holes and can read out this information by means of an AFM operation; and then such information is outputted. Thus, the heat emitting probe 19 is an input-output probe for the thermal recording medium 22.

Figure 2:
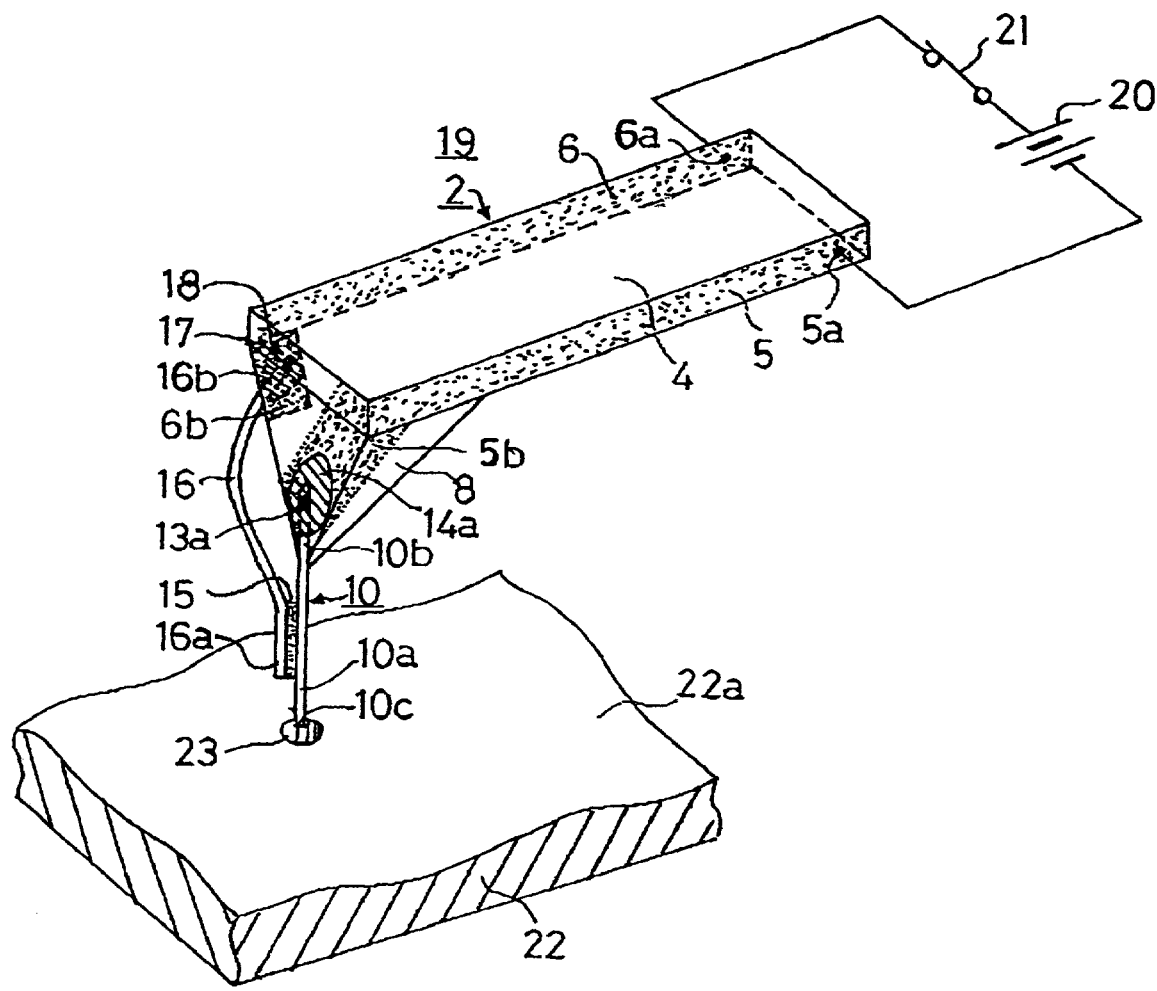
FIG. 2 is a schematic perspective view of a second embodiment of the heat emitting probe according to the present invention.

FIG. 2 shows the second embodiment of the heat emitting probe of the present invention.

Elements that are the same as in the first embodiment are referred to with the same reference numerals, and a description of such elements is omitted. The second embodiment differs from the first embodiment in that joining electrode films 5b and 6b are formed on the holder 8. Of these two films, the joining electrode film 5b is installed instead of the conductive nanotube lead wire 12.

More specifically, the joining electrode film 5b is electrically continuous with the electrode film 5. Accordingly, voltage application to the conductive nanotube probe needle 10 is made possible merely by fastening the base end portion 10b of the conductive nanotube probe needle 10 by means of the coating film 14a. In other words, there is no need for the conductive nanotube lead wire 12, fused portion 13b or coating film 14b. Thus, the second embodiment is characterized in that it is possible to dispense with the process required for these elements. Furthermore, since the lead tip end portion 16b of the lead wire 16 is fastened to the joining electrode film 6b, the advantage is that a short lead wire can be used as the conductive nanotube lead wire 16.

In the second embodiment, since the formation of the joining electrode film Sb can be performed at the same time as the formation process of the electrode films 5 and 6, it is possible to lower the manufacturing cost by eliminating the process for such elements. In terms of being able to input information in the thermal recording medium 22 and output information from this medium, the heat emitting probe 19 is substantially the same as that of the first embodiment; accordingly, details are omitted here.

Figure 3:
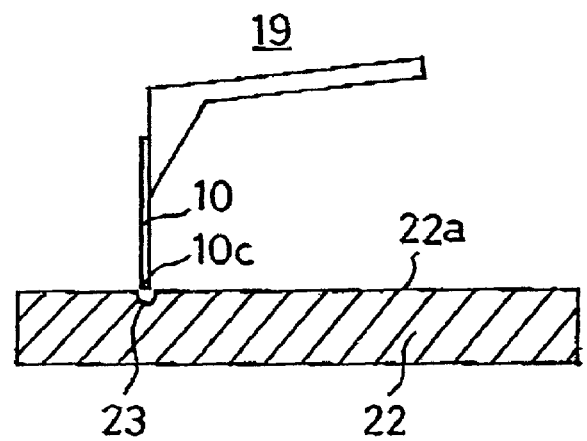
FIG. 3 is a model diagram showing the initiation of recording on the thermal recording medium.

FIG. 3 is a model diagram showing the initiation of recording on a thermal recording medium.

The heat emitting probe 19 is disposed with the tip end 10c of the conductive nanotube probe needle 10 in close proximity to the surface 22a of the thermal recording medium 22. When an electric current is passed through the heat emitting probe 19 in this state, the tip end 10c of the heat emitting probe 19 emits heat, thus melting portions of the surface 22a and forming holes 23.

Figure 4:
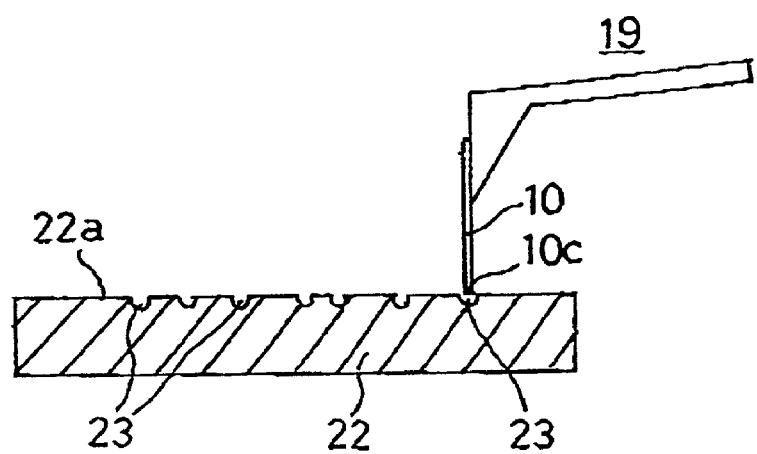
FIG. 4 is a model diagram showing the multi-point recording on the thermal recording medium.

FIG. 4 is a model diagram showing multi-point recording on the thermal recording medium.

When the tip end 10c is intermittently heated by the control circuit C while the heat emitting probe 19 scans over the surface 22a of the thermal recording medium 22, numerous holes 23 are formed in the surface 22a. Large quantities of information are recorded on the thermal recording medium 22 by the on-off switching of these rows of holes.

Figure 5:
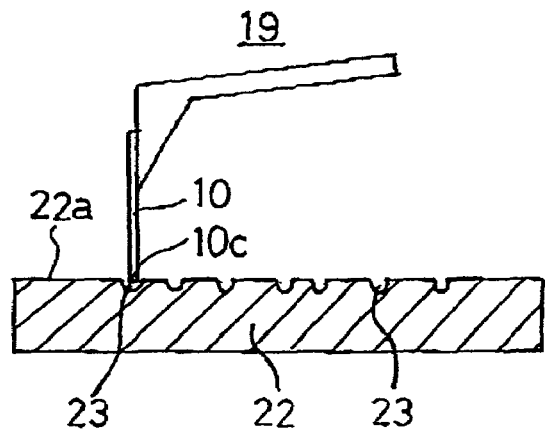
FIG. 5 is a model diagram showing the AFM read-out of recorded holes by the heat emitting probe.

FIG. 5 is a model diagram showing AFM reading of rows of recorded holes by the heat emitting probe.

The heat emitting probe 19 is brought back to its original position, and the tip end of the conductive nanotube probe needle 10 is caused to contact the surface 22a. In this state, the heat emitting probe is caused to perform an AFM scan, so that the indented and projecting patterns obtained by the rows of holes are read out by the tip end 10c. This read-out constitutes the output of information from the thermal recording medium 22.

Figure 6:
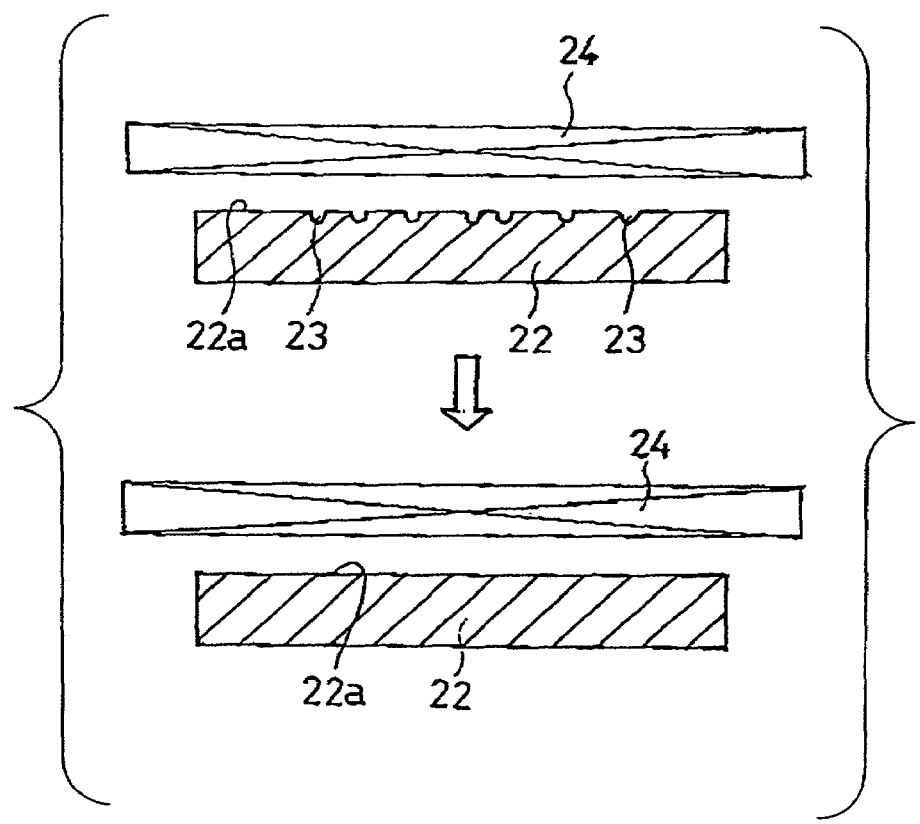
FIG. 6 is a model diagram showing the thermal resetting of the thermal recording medium.

FIG. 6 is a model diagram of the thermal resetting of the thermal recording medium.

A heater 24 is disposed so as to face the surface 22a of the thermal recording medium 22 on which the information has been recorded as rows of holes. When the surface 22a of the thermal recording medium 22 is heated by the heater 24, the entire surface 22a is melted by heating, and the rows of holes are eliminated at one time, thus resulting in a flat surface. This means that the recorded information has been deleted. If a scanning type wire-form heater is used, an effect substantially the same as that of a surface-form heater can be obtained by a scanning operation.

Figure 7:
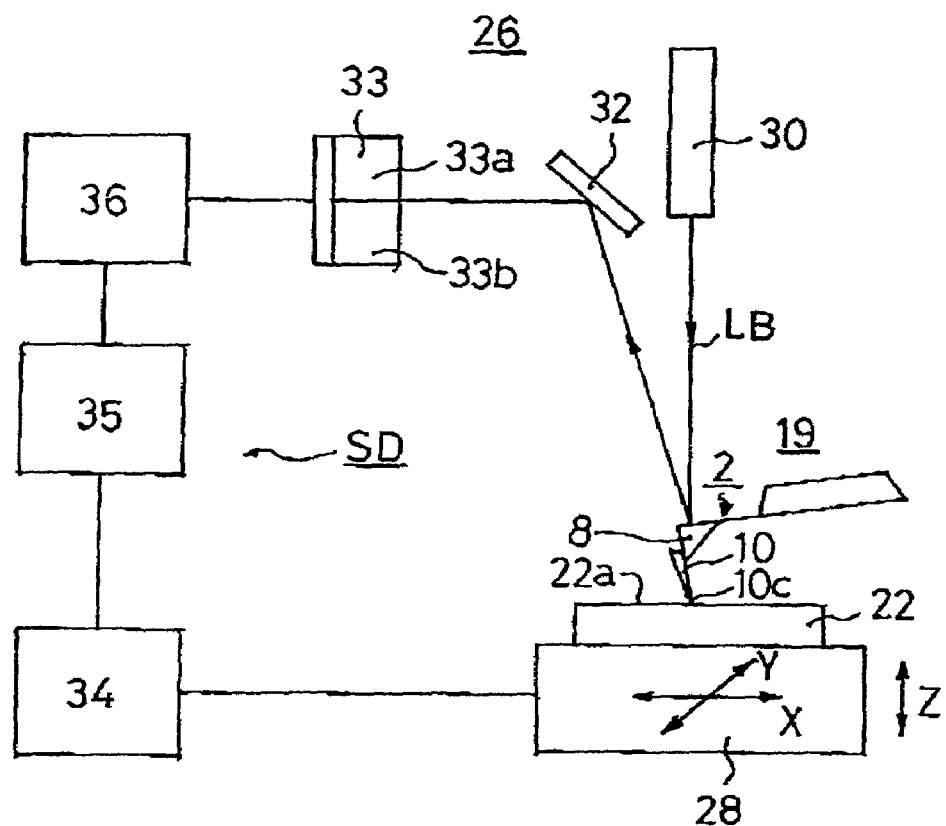
FIG. 7 is a structural diagram of a first embodiment of the heat emitting probe apparatus according to the present invention.

FIG. 7 shows the first embodiment of the heat emitting probe apparatus of the present invention.

The heat emitting probe apparatus 26 includes the heat emitting probe 19 and a scanning mechanism SD. The heat emitting probe 19, which is of one of the above-described probes, is detachably fastened to a holder setting section (not shown). Replacement of the heat emitting probe 19 is accomplished by way of removing and replacing the heat emitting probe 19. Following this fastening to the holder setting section, the tip end 10c of the conductive nanotube probe needle 10 is positioned in close proximity to the surface 22a of the thermal recording medium 22.

The thermal recording medium 22 is driven in the X, Y and Z directions by a scanning driving section 28 that is comprised of piezo-electric elements. The reference numeral 30 is a semiconductor laser device, 32 is a reflective mirror, 33 is a two-part light detector including an upper detector 33a and a lower detector 33b, 34 is an XYZ scanning circuit, 35 is an AFM display device, and 36 is a Z-axis detection circuit.

The surface 22a of the thermal recording medium 22 is horizontal and smooth. After the tip end 10c is brought to near this surface to a point located at a specified distance in the Z direction, the heat emitting probe 19 is operated to scan in the X and Y directions by the scanning driving section 28. This driving of the probe 19 is controlled by the XYZ scanning circuit 34, and a scanning diagram of the points where holes are formed in the surface 22a is displayed by the AFM display device 35. In this way, information is recorded as rows of holes in the surface 22a of the thermal recording medium 22.

Next, the rows of holes that have been formed are read out, i.e., the recorded information is outputted by this heat emitting probe apparatus 26. First, the tip end 10c of the conductive nanotube probe needle 10 is moved to approach the surface 22a of the thermal recording medium 22 until the tip end 10c reaches a specified repulsive-force position. Afterward, with the Z position fixed, the scanning driving section 28 is driven to scan in the X and Y directions by the scanning circuit 34.

In this scanning, the cantilever 2 is caused to flex by the indentations and projections of the surface atoms, and the reflected laser beam LB enters the two-part light detector 33 with the position of the beam displaced. The amount of displacement in the direction of the Z axis is calculated by the Z-axis detection circuit 36 from the difference in the amounts of light detected by the upper and lower detectors 33a and 33b, and the Z position is adjusted so that this amount of displacement is canceled out. The surface atom image is displayed by the AFM display device 35 with this amount of displacement taken as the amount of indentation and projection of the surface.

The image of the indentations and projections in the surface is an image of the rows of holes, and the content of the recorded information is outputted by the detection of this image of the rows of holes. The shown apparatus is constructed so that the thermal recording medium 22 is scanned in the X, Y and Z directions; however, it is also possible to have the heat emitting probe 19 operate to scan in the X, Y and Z directions.

In FIG. 7, an image of the sample surface is detected using an optical lever system; however, a recently developed piezo-electric body system can be also used. In this system, a piezo-electric body is installed on the cantilever portion, and the flexing of the cantilever portion is detected by means of the deformation of the piezo-electric body. Then, the Z-axis displacement, i.e., the amount of indentation and projection, is detected by the voltage that is generated in proportion to the amount of this deformation.

Figure 8:
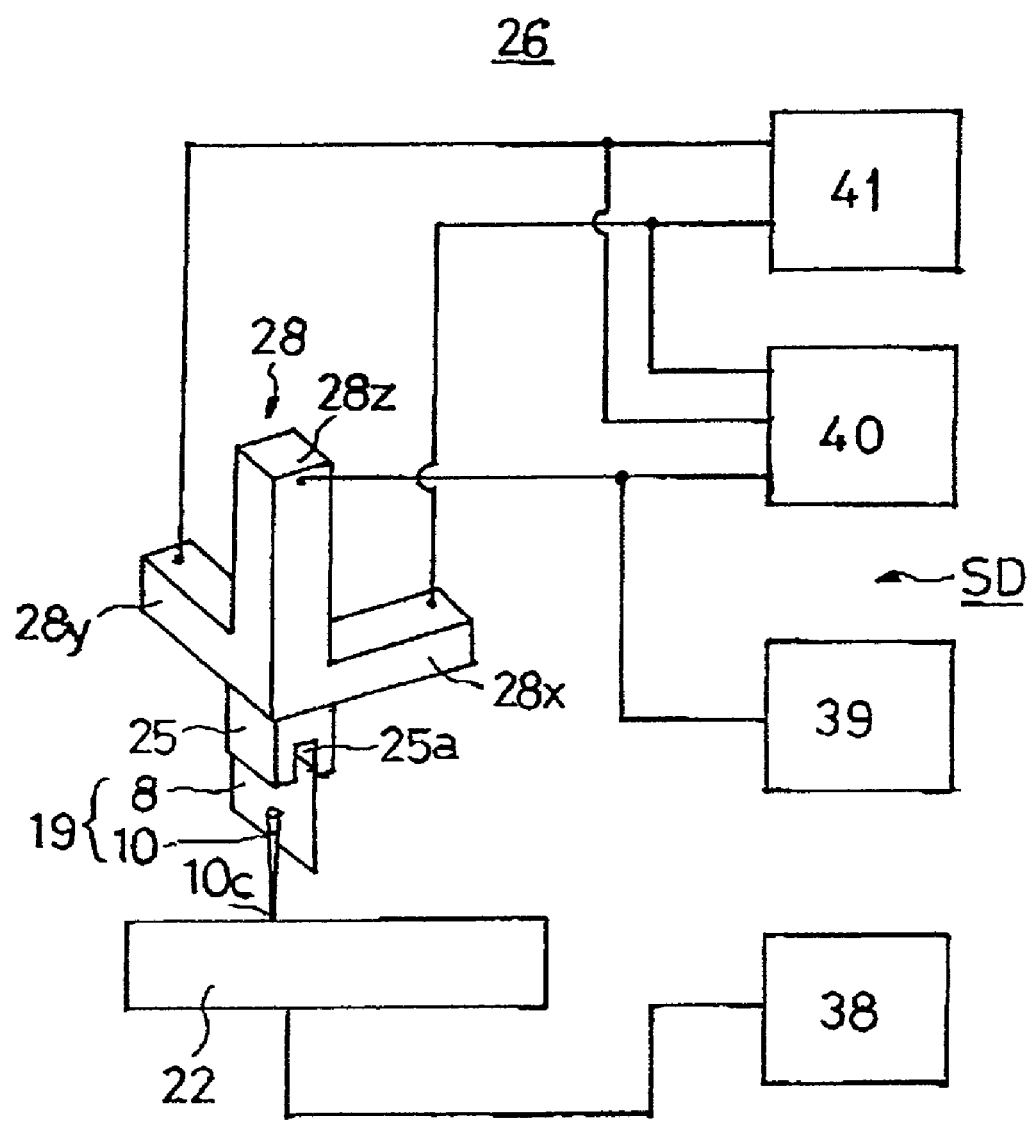
FIG. 8 is a structural diagram of a second embodiment of the heat emitting probe apparatus according to the present invention.
Figure 9:
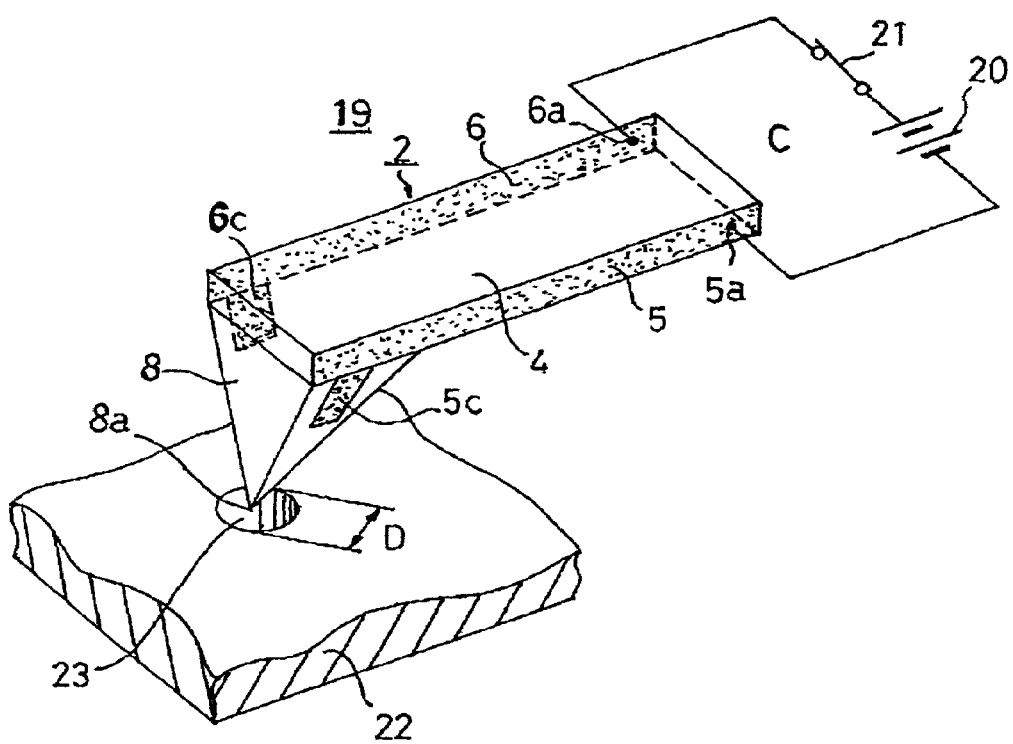
FIG. 9 is a schematic perspective view showing the recording of information using a conventional heat emitting probe.

FIG. 8 shows the second embodiment of the heat emitting probe apparatus of the present invention.

In this embodiment, an STM holder is used instead of an AFM cantilever. Here, STM refers to a "scanning tunnel microscope". This STM holder 8 is an insulating flat-plate-form holder, and the probe apparatus is obtained by fastening the conductive nanotube probe needle 10 to this holder 8 by means of thermal fusion and a coating film.

The structure of the conductive nanotube probe needle 10 and holder 8 is exactly the same as that shown in FIG. 1 or 2; accordingly, details are not described. However, to describe this structure in brief, a heat emitting body 22 is deposited on the outer circumferential surface of the conductive nanotube probe needle 10, and one end of a conductive nanotube lead wire is fastened to this heat emitting body. A control circuit used for voltage application is connected to the other end of this conductive nanotube lead wire and the base end portion 10b of the conductive nanotube probe needle 10 via two electrode films. The heat emitting body is caused to emit heat through the passage of an electric current by this control circuit, so that the tip end 10c of the conductive nanotube probe needle 10 is caused to act as a heat emitting point.

The holder 8 is inserted into the cut-out groove 25a of a holder setting section 25 and is fastened in place in a detachable manner by spring pressure. The scanning driving section 28, which is comprised of an X piezo-electric element 28x, a Y piezo-electric element 28y and a Z piezo-electric element 28z, realizes scanning of the heat emitting probe 19 with respect to the thermal recording medium 22 by performing a three-dimensional expansion and contraction operation of the holder setting section 25 in the X, Y and Z directions.

The reference numeral 38 is a tunnel current detection circuit, 39 is a Z-axis control circuit, 40 is an STM display device, and 41 is an XY scanning circuit.

In operation, the tip end 10c of the conductive nanotube probe needle 10 is first brought to approach the surface 22a of the thermal recording medium 22 to a point located at a specified distance in the Z direction by the Z-axis control circuit 39. Afterward, information is inputted by melting and forming rows of holes in the surface 22a of the thermal recording medium 22 while the tip end 10c is operated to scan by the XY scanning circuit 41.

Next, the recorded information consisting of rows of holes is read out by STM scanning, and information is outputted. In other words, the tip end 10c is subjected to expansion and contraction control in the Z direction by the Z-axis control circuit 39 so that the tunnel current at each XY position is constant, and this amount of movement is taken as the amount of indentation and projection in the direction of the Z axis. As the heat emitting probe 19 scans in the X and Y directions, an image of the surface atoms of the rows of holes is displayed by the STM display device 40.

In the shown embodiment, in cases where the heat emitting probe 19 is to be replaced, the holder 8 is removed from the holder setting section 25, and the entire heat emitting probe 19 is replaced as a unit.

In the above embodiments, the heat emitting probe is used as the input-output probe for a thermal recording medium. Other utilization, however, are also possible. In the following description, a sample is set instead of a thermal recording medium; and the heat emitting probe is utilized, for instance, as a probe that measures the temperature distribution of a sample surface.

When the probe is caused to approach the sample surface, the heat emitting body responds to the temperature of the sample surface, and the resistance value of the heat emitting body varies. Accordingly, if a specified voltage is applied to the heat emitting body, the current varies. If the probe scans over the sample surface in this state, the resistance value varies continuously according to the temperature distribution, and the temperature distribution of the sample surface can be measured by this current variation.

Furthermore, the heat emitting probe is utilized as a probe that measures the thermal conductivity distribution of a sample surface. In this case, a specified voltage is applied to the heat emitting body, so that the heat emitting body is caused to emit heat at a fixed heat emission rate. When this probe is caused to approach the sample surface, the heat is dissipated into the sample surface according to the thermal conductivity of the sample surface. The heat emitting body is cooled by this heat dissipation rate, the resistance value varies, and this variation in the resistance causes a variation in the current. The thermal conductivity distribution of the sample surface can be measured by means of this current variation.

The present invention is not limited to the above-described embodiments. Various modifications and design alterations within the limits that involve no departure from the technical concept of the present invention are also included in the technical scope of the present invention.

As seen from the above, according to the present invention, a heat emitting probe is obtained by fastening a conductive nanotube probe needle on which a heat emitting body is formed to a holder, a current is passed through the heat emitting body, and the tip end of the conductive nanotube probe needle is caused to approach the sample surface. Accordingly, on a sample surface of a thermal recording medium, the tip end acts as a heat emitting point, and holes that are formed by melting and have a diameter reduced to at least a value of a few nm are obtained. Thus, the thermal recording density can be greatly increased. Furthermore, when thermal information such as the temperature distribution or thermal conductivity distribution, etc. of the sample surface is detected, such thermal information can be detected with nano-scale precision.

Also, the heat emitting probe of the present invention is obtained by using the protruding portion of an AFM cantilever as a holder and by fastening a conductive nanotube probe needle to this holder. Accordingly, cantilever manufacturing technology that has been accumulated in the past is applicable "as is", and a heat emitting probe can be provided relatively easily and at low cost.

Furthermore, in the present invention, an AFM cantilever is used for the heat emitting probe, and current is passed through the heat emitting body using two conductive nanotube lead wires. Accordingly, the electrode construction for passing the current through the heat emitting body can be constructed simply by way of the use of the flexibility of conductive nanotube lead wires.

In addition, the heat emitting probe apparatus of the present invention includes a heat emitting probe of the type described above, a scanning mechanism for this heat emitting probe, and a control circuit used for heat emission. Accordingly, thermal information of a sample can be read out with high precision by introducing an AFM scanning mechanism or STM scanning mechanism as the scanning mechanism.

Also, in the heat emitting probe apparatus of the present invention, information can be recorded at a high density on a thermal recording medium using nano-scale hole patterns, and this information can also be read out. Accordingly, the input and output of information into and from a thermal recording medium can be accomplished at a high density and with high precision.

Furthermore, the heat emitting probe of the heat emitting probe apparatus detects the thermal conductivity distribution of a sample surface with high precision in nano-scale terms on the basis of the variation in the amount of heat dissipated from the heat emitting body or on the basis of the variation in the resistance of the heat emitting body.

Still further, the heat emitting probe detects the temperature distribution of a sample surface with high precision in nano-scale terms as a variation in the resistance of the heat emitting body.

The invention claimed is:

1. A heat emitting probe comprising:
   a conductive carbon nanotube probe needle with a base end portion thereof fastened to a holder and a tip end portion thereof protruding from said holder,
   a heat emitting body provided on a circumferential surface of said conductive carbon nanotube probe needle,
   a conductive carbon nanotube lead wire whose one end is fastened to said heat emitting body, and
   a means for causing an electric current to pass through said heat emitting body by applying a voltage between said conductive carbon nanotube lead wire and said conductive carbon nanotube probe needle so that said heat emitting body is heated by said electric current.

2. The heat emitting probe according to claim 1, wherein:
   a protruding portion formed on a cantilever portion of an atomic force microscope (AFM) cantilever is employed as said holder; and
   said means for causing said electric current to pass through is comprised of
      two electrode films which are provided on said cantilever portion,
      one end of said conductive carbon nanotube lead wire which is connected to one of said electrode films, and
      said conductive carbon nanotube probe needle which is connected to another of said electrode films, wherein
   said electric current is caused to pass between said electrode films.

3. The heat emitting probe according to claim 1, wherein:
   a protruding portion formed on a cantilever portion of an atomic force microscope (AFM) cantilever is employed as said holder; and
   said means for causing said electric current to pass through is comprised of
      two electrode films which are provided on said cantilever portion,
      one end of said conductive carbon nanotube lead wire which is connected to one of said electrode films, and
      another conductive carbon nanotube lead wire by which said conductive carbon nanotube probe needle is connected to another of said electrode films, wherein
   said electric current is caused to pass between said electrode films.

4. A heat emitting probe apparatus comprising:
   said heat emitting probe according to claim 1, 2 or 3,
   a scanning mechanism that allows a tip end of said conductive carbon nanotube probe needle of said heat emitting probe to scan over a sample, and
   a control circuit which passes an electric current through said tip end of said conductive carbon nanotube probe needle, wherein
   said tip end of said conductive carbon nanotube probe needle scans a surface of a sample.

5. The heat emitting probe apparatus according to claim 4, wherein
   said sample is a thermal recording medium, and
   said tip end of said conductive carbon nanotube probe needle is heated by said heat emitting body, and wherein
   information is recorded by means of a hole pattern formed in a surface of said thermal recording medium.

* * * * *